United States Patent [19]

Nakamura et al.

[11] 4,319,137

[45] Mar. 9, 1982

[54] APPARATUS FOR IDENTIFYING SHEET-LIKE PRINTED MATTERS

[75] Inventors: Yasushi Nakamura, Yokohama; Ko Ohtombe, Tokyo; Akihiro Nishito, Yokohama, all of Japan

[73] Assignee: Tokyo Shibaura Denki Kabushiki Kaisha, Kawasaki, Japan

[21] Appl. No.: 91,962

[22] Filed: Nov. 7, 1979

[30] Foreign Application Priority Data

May 23, 1978 [JP] Japan ..................... 53/60573

[51] Int. Cl.[3] .................... G06K 5/00

[52] U.S. Cl. .................... 250/556; 356/71

[58] Field of Search .................... 250/556, 223, 208, 209, 250/578, 226; 356/71, 444; 340/146.3 AG

[56] References Cited

U.S. PATENT DOCUMENTS

| | | | |
|---|---|---|---|
| 3,345,908 | 10/1967 | Jensen | 356/71 |
| 3,491,243 | 1/1970 | Tsugami | 250/556 |
| 4,179,685 | 12/1979 | O'Maley | 250/556 |
| 4,204,765 | 5/1980 | Iannadrea et al. | 356/71 |

*Primary Examiner*—David C. Nelms
*Attorney, Agent, or Firm*—Oblon, Fisher, Spivak, McClelland & Maier

[57] ABSTRACT

An apparatus for identifying whether a sheet-like printed matter is true or false comprises means for detecting a plurality of positions of a moving sheet-like printed matter to produce a plurality of position signals, timing signal generating means for producing timing signals on the basis of the position signals, a reference light source for irradiating an information detecting area lying on the object moving path to detect the information of the sheet-like object, opto-electric converting means which produces an electric signal with an amplitude corresponding to an intensity of a reference light transmitted through or reflected from the printed matter when the object exists in the information detecting area and an electric signal with an amplitude corresponding to an intensity of reference light when the object does not exist in the information detecting area; integration means for integrating the electrical signal from the opto-electric converting means which integrates an electric signal from the opto-electric converting means during a first period defined by a timing signal from the timing signal generating means and integrates an electric output signal of the printed matter during the second period defined by the timing signal from the timing signal generating means, an operation means for operating a ratio of the integrated data of the reference light with integrated data of the printed data of the printed matter, and judging means which compares the operated data derived from the operation means with the data representing a true printed matter previously stored to judge whether the printed matter is true or not.

4 Claims, 24 Drawing Figures

FIG.3A
FIG.3B
FIG.3C
FIG.3D
FIG.3E
FIG.3F
FIG.3G
FIG.3H
FIG.3I
FIG.3J
FIG.3K
FIG.3L
FIG.3M
FIG.3N
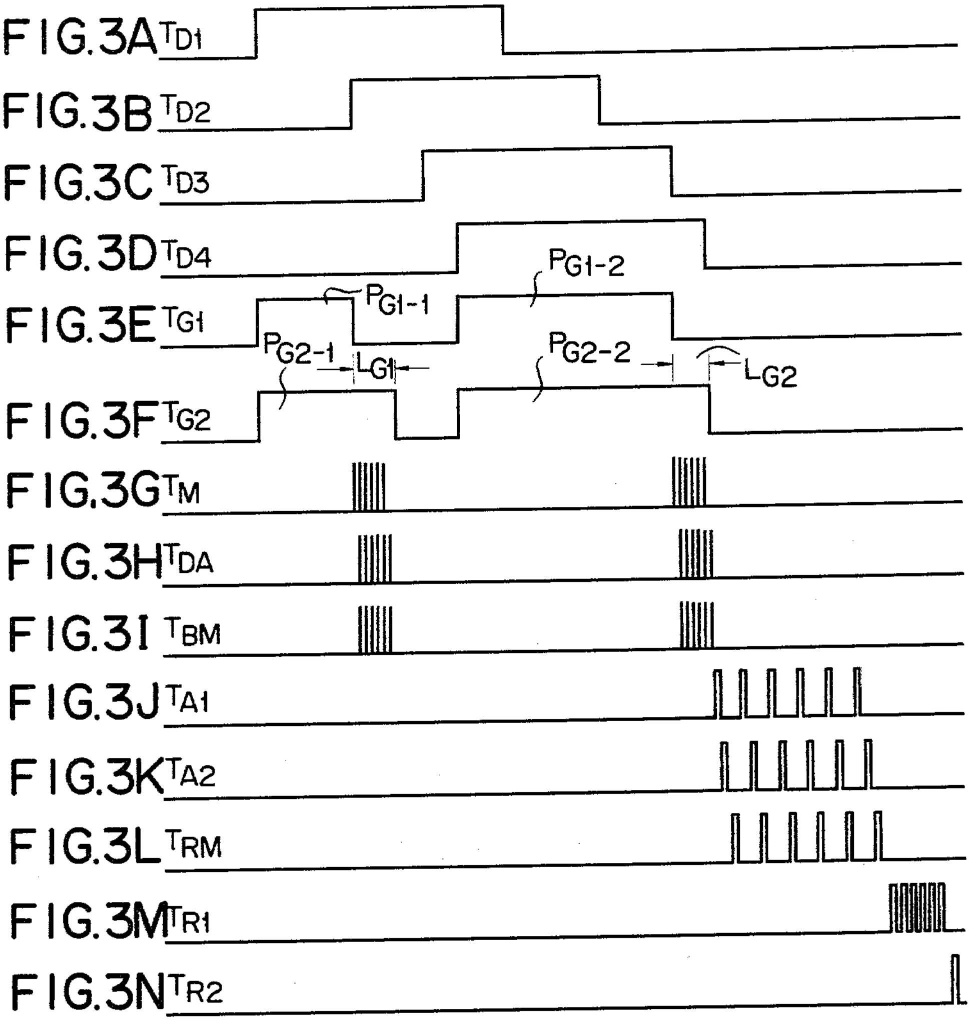
FIG. 4A
FIG. 4B
FIG. 4C
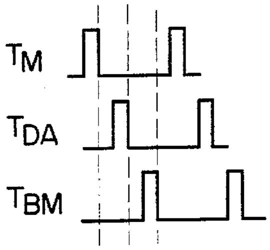

APPARATUS FOR IDENTIFYING SHEET-LIKE PRINTED MATTERS

BACKGROUND OF THE INVENTION

1. Field of the Invention

The invention relates to an apparatus for identifying sheet-like printed matters and, more particularly, to one which identifies whether a sheet-like material is true or false.

2. Description of the Prior Art

Already known is an apparatus which identified objects e.e. passenger ticket and securities as true ones or false ones, and which is used with a transporting means such a belt. The phrase "true and false" is used here in two senses. First, it means that an object is fit or unfit. More specifically, even though a bank note is genuine, for example, it is considered unfit for recirculation if it is stained too much, torn too much or has an adhesive tape on it. Secondly, it means that an object such as note and securities is genuine or counterfeit.

A conventional identifying apparatus of this type is provided with three opto-electric converting elements such as photo diodes disposed at both sides of a transporting path of the object. Those three opto-electric converting elements sense red, green and blue color components included in incident rays of light, respectively. When there is no object in an object information detecting area on the object transporting path, those converting elements directly receive reference rays of light emitted from a reference light source. On the other hand, when the object exists in the area, the elements receive the reference rays transmitted through or reflecting from the object. The outputs of the converting elements are amplified by the corresponding amplifying circuits to have proper amplitudes, respectively. The amplifying circuits have automatic gain control circuits associated therewith. The output signals from the amplifier circuits are integrated for a given time by integration circuits provided corresponding to the amplifier circuits under control of timing signals delivered from a system control circuit. The integrated data from the integration circuits are applied to a division circuit, an adder circuit and the like where those are properly processed, and then are applied to corresponding comparators. In the comparators, true object data read out from a true object information memory previously storing true object information are compared with the operated data of the integrated ones for judging whether the object is true or false.

The automatic gain control circuits respectively control the gains of the corresponding amplifying circuits so that the output signals V1, V2 and V3 from the amplifying circuits are so related as to be V1=V2=V3 during a period that the opto-electric converting elements receive the reference ray, under control of the control signals from the system control circuit. During a time period that the opto-electric converting elements are receiving light rays transmitted through or reflecting from the object, each feedback loop for the gain control is open.

The following problems are involved in the conventional identifying apparatus, however. Although a high precision is required for the gain control of each automatic gain control circuit, it is in fact difficult to well balance the mutual adjustments among the gain control circuits. This results in degradation of the identifying or judging accuracy of the apparatus. Further, it is impossible to remove detrimental and varying factors inherently included in the gain control circuits. Moreover, since the integrating time of the output signals from the amplifying circuits are prefixed, a variation of the speed of the moving transport belt directly appears as an error of the detected signal. In other words, it is impossible to remove an error of the detected signal arising from a variation of the transporting speed of the belt.

SUMMARY OF THE INVENTION

Accordingly, an object of the invention is to provide an identifying apparatus with a high identifying accuracy.

Another object of the invention is to provide an apparatus for identifying whether a sheet-like printed matter is true or false without an accurate adjustment of each automatic gain control circuit and free from a degradation of an identifying accuracy when the transport speed of an object to be identified varies.

According to the present invention, there is provided an apparatus for identifying whether a moving sheet-like printed matter is true or false comprising: a plurality of position detection means for detecting a plurality of positions of a moving sheet-like printed matter and producing position signals; a timing signal generating means for producing timing signals on the basis of the position signals; a reference light source for detecting information of the sheet-like printed matter and irradiating an information detecting area on the object moving path; an opto-electric converting means which produces an electric signal with an amplitude corresponding to an intensity of a reference light transmitted through or reflected from the printed matter when the printed matter exists in the information detecting area and produces an electric signal with an amplitude corresponding to an intensity of reference light when the printed matter does not exist in the information detecting area; an integration means for integrating the electrical signal from opto-electric converting means which integrates an electric signal delivered from the opto-electric converting means during a first period defined by a timing signal from the timing signal generating means and integrates an electric output signal of the printed matter during the second period defined by the timing signal from the timing signal generating means; an operation means for operating a ratio of the integrated data of the reference light with integrated data of the printed matter; and a judging means which compares the operated data derived from the operation means with the data representing a true printed matter previously stored to judge whether the printed matter is true or false.

BRIEF DESCRIPTION OF THE DRAWINGS

The invention will be better understood from the following description taken in connection with the accompanying drawings, in which:

FIGS. 3A to 3N show in graphical form timing signals at the operation of logical system shown in FIG. 2;

FIGS. 4A to 4C show in enlarged form timing signals shown in FIGS. 3G to 3I;

DETAILED DESCRIPTION OF THE PREFERRED EMBODIMENT

Figure 1:
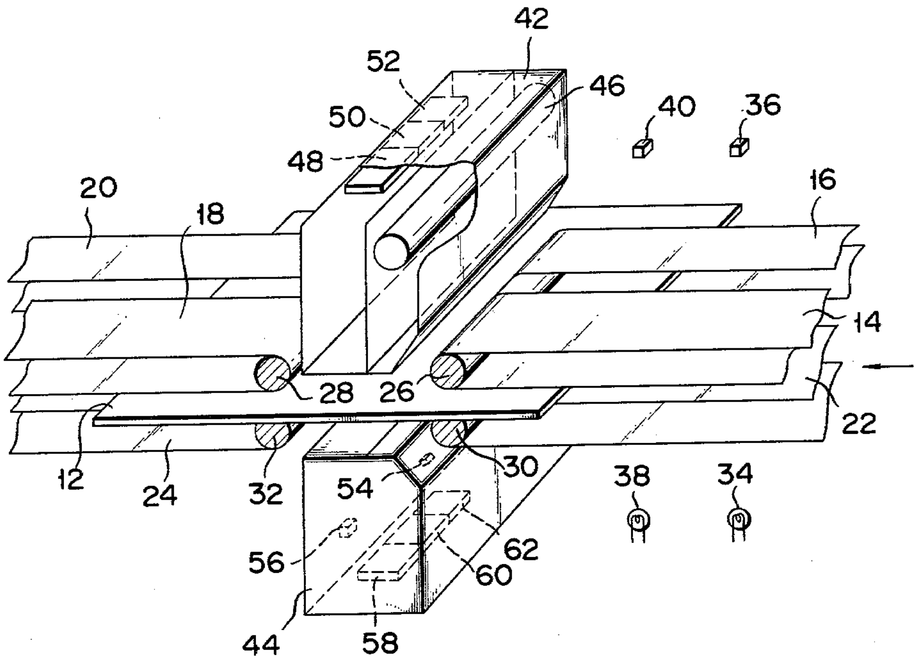
FIG. 1 shows a perspective view of a structure of an apparatus for identifying a sheet-like printed matter whether the printed matter is true or false which is an embodiment of the present invention.

Referring to FIG. 1, reference numeral 12 represents an object to be identified such as a sheet-like printed matter. The object 12 is transported to the left (the direction indicated by an arrow) as viewed in the drawing of FIG. 1 along a transport path by eight transport belts disposed above and below the object 12. Only six transport belts designated by reference numerals 14, 16, 18, 20, 22 and 24 are illustrated in the drawing, for simplicity of illustration. In those belts, the belts 14 and 16 are driven by a roller 26; the belts 18 and 20 by a roller 28; the belt 22 by a roller 30; the belt 24 by a roller 32. Although the drive means for those rollers 26 to 32 are not illustrated, motors may be used for those drive means. A given space is provided between the belts 14 and 16, extending in a transport direction, or a direction in which the object 12 moves. Another given space is also provided between the two belts (one of them is designated by reference numeral 22 but the other is not shown in the figure) under the belts 14 and 16, extending in the belt travelling direction. Above and below the transport path is disposed an object position detecting unit including a light source and an opto-electric converting element such as a photo diode, with given spaces intervening therebetween. More specifically, the object position detecting unit having a light source 34 and an opto-electric converting element 36, or an object position detecting element is disposed on the right side as viewed in the drawing. Another object position detecting unit having a light source 38 and an opto-electric converting element 40, or an object detecting element is disposed on the left side of the former detecting unit.

On the transport path of the object 12, a couple of object information detecting units 42 and 44, which form an object information detecting device, are disposed above and below the object transport path. As shown, the detecting unit 42 houses a reference light source 46 and three opto-electric converting elements 48, 50 and 52 as object detecting elements. The unit 44 houses a couple of opto-electric converting elements 54 and 56 as object position detecting elements for detecting a position of object 12 in cooperation with the reference light source 46 and three opto-electric converting elements 58, 60 and 62 as object detecting elements. The elements 48, 50 and 52 receive light components emitted from the light source 46 and reflected on the upper surface of a member of the unit 44 when there is no object in the object information detecting area in the object transport path. On the other hand, when an object exists in the detecting area, those elements receive the reference light reflected from the object. In the specification, the term, "the object information detecting area" indicates an area lying on the transport path defined by a straight line connecting the position detecting element 54 and the reference light source 46 and another straight line connecting the position detecting element 56 and the same.

The object information detecting elements 58, 60 and 62 receive directly the reference light from the reference light source 46 when there is not found the object 12 in the object information area. When it is found there, those elements receive the reference light after it passes through the object. Those information detecting elements 48, 50 and 52 sense the color components, red, green and blue included in the received light and produce electric signals with amplitudes corresponding to the intensities of those color components. Similarly, the information detecting elements 58, 60 and 62 also sense those three color components to produce electric signals corresponding to the intensities of the color components.

As shown in FIG. 1, the position detecting elements 36, 40, 54 and 56 are arranged on the object moving path in the object moving direction in this order. Accordingly, when the object 12 is transported in an arrow direction in FIG. 1, the position detecting element 36 first detects the moving object 12 and then the elements 40, 54 and 56 successively detect the object 12 in this order.

Figure 2:
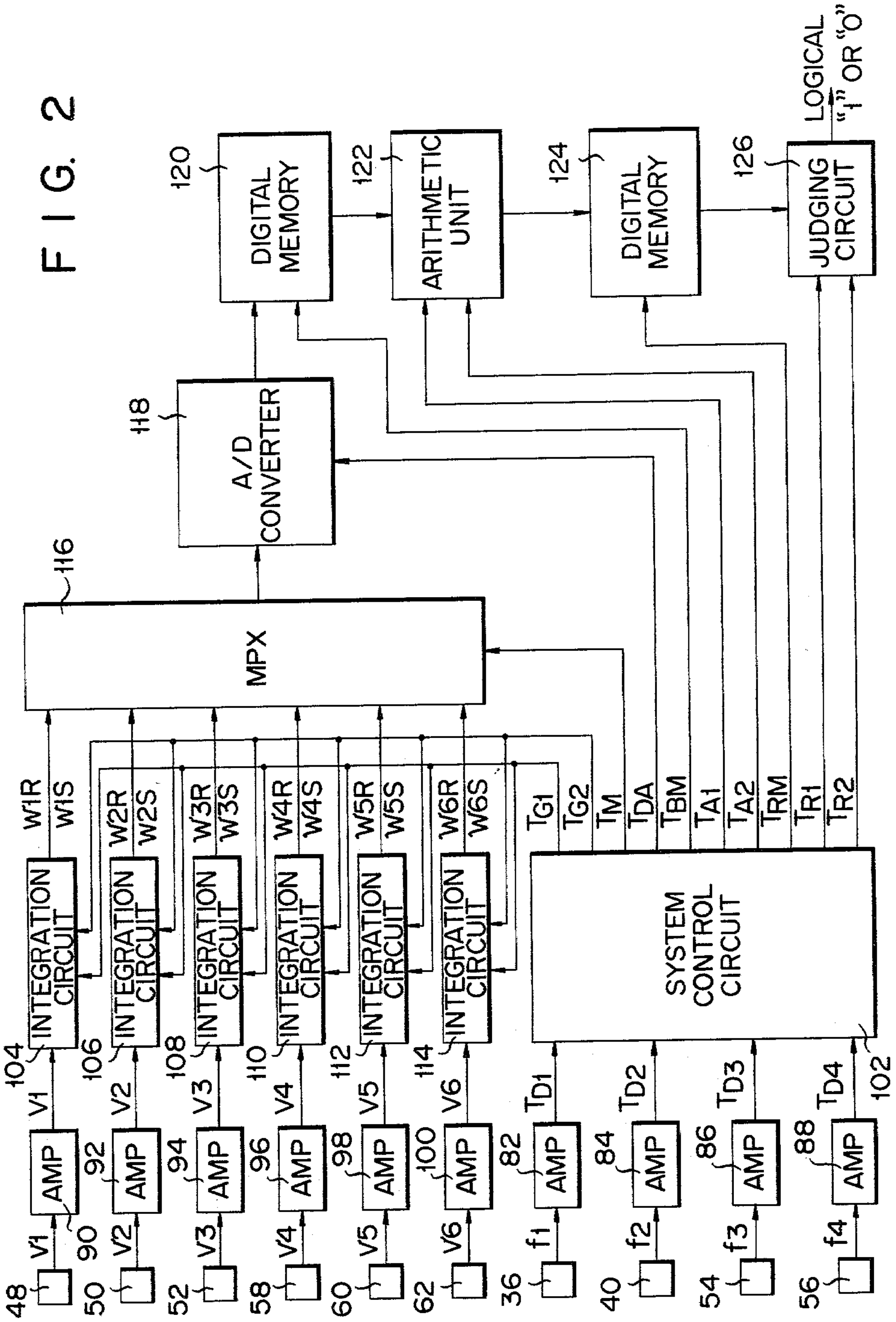
FIG. 2 shows a block diagram of a logical system for signal processing used in the identifying apparatus shown in FIG. 1.

Turning now to FIG. 2, there is shown a signal processing/identifying system for identifying the object on the basis of various signals obtained from the identifying apparatus constructed as shown in FIG. 1. The operation of the signal processing/identifying system is diagrammatically illustrated in FIGS. 3A to 3N.

Now it is assumed that the object 12 is transported from the left side as viewed in FIG. 1. The position detecting elements 36, 40, 54 and 56 detect the moving object 12, that is, the positions of the object 12. In more particular, the positions of the object 12 are detected in the manner that the leading edge of the object 12 successively interrupts optical paths between those position detecting elements and the light source. For example, in the case of the position detecting element 36, it travels along the transport path in the arrow direction to interrupt at its leading edge the optical path between the light source 34 and the position detecting element 36. As a result, the detecting element 36 receives no light from the light source 34, so that the level of an electric signal (position signal) f1 produced from the element 36 changes. One learns the travel of the object 12 by the level change of the signal f1. In this way, as the object progresses, those remaining elements 40, 54 and 56 sequentially produce electric signals f2, f3 and f4 with levels changed.

The position detecting elements 36, 40, 54 and 56 are respectively connected to amplifiers 82, 84, 86 and 88 which amplify position signals f1 to f4 from those detective elements to have given amplitudes. Those signals f1 to f4 are amplified in this way by the amplifier 82, 84, 86 and 88 to become position signals $T_{D1}$ to $T_{D4}$. Those amplifiers are coupled with a system control circuit 102 which produces various timing signals on the basis of position signals $T_{D1}$ to $T_{D4}$.

The object information detecting elements 48, 50, 52, 58, 60 and 62 are coupled with amplifier circuits 90, 92, 94, 96, 98 and 100 for amplifying the output signals v1 to v6 to be given amplitudes of the signals, respectively. The amplifier circuits 90, 92, 94, 96, 98 and 100 are respectively coupled with integration circuits 104, 106, 108, 110, 112 and 114 for integrating the output signals V1 to V6 from the amplifier circuits 90 to 100 for a given time period under control of a timing signal $T_{G1}$ as shown in FIG. 3E delivered from the system control circuit 102. To the integration circuits 104 to 114, an integrated data holding signal $T_{G2}$ as shown in FIG. 3F also is applied which holds the integrated data for a given period. The integration circuits 104 to 114 are connected through a multiplexer (abbreviated as MPX in the drawing) to an analog to digital converter (abbreviated as an A/D converter) 118. The integrated data w1R, w2R, w3R, w4R, w5R and w6R of the reference light and the object information integrated data w1S to w6S of the object 12 which are produced by the integration circuits 104, 106, 108, 110, 112, 114, are sequentially applied to the A/D converter 118 in a given order by the multiplexer 116 under control of the timing signal $T_M$ as shown in FIG. 3G, during the hold time period. The A/D converter 118 successively converts the incoming signals w1R to w6R and w1S to w6S are converted into digital signals under control of the timing signal $T_{DA}$ as shown in FIG. 3H from the control circuit 102. The A/D converter 118 is connected to a digital memory 120 and the integrated signals A-D converted are stored in the digital memory 120 under control of a timing signal $T_{BM}$ as shown in FIG. 3I. The memory 120 is also connected to an arithmetic unit 122. The arithmetic unit 122 reads out data stored in the memory 120 under control of the timing signals $T_{A1}$ and $T_{A2}$ as shown in FIGS. 3J and 3K and performs the operation, $Yn=(wnS/WnR)\times K$ where "K" is constant and "n" is 1 to 6. The arithmetic unit 122 is connected to a digital memory 124 and the operated data Yn (=Y1 to Y6) is stored in the memory 124 under control of a timing signal $T_{RM}$ as shown in FIG. 3L. The digital memory 124 is connected to a judging circuit 126 where the object 12 is judged whether it is true or false under control of timing signals $T_{R1}$ and $T_{R2}$ as shown in FIGS. 3M and 3N.

Now there will be described more in detail the operation and construction of the signal processing logic system shown in FIG. 2.

As shown in FIGS. 3A to 3D, the position signals $T_{D1}$ to $T_{D4}$ become logical '1' when the position of the object 12 is detected. The system control circuit 102 receives the position signals $T_{D1}$ to $T_{D4}$ and produces various timing signals as shown in FIGS. 3E to 3N on the basis of the position signals. The construction and operation of the control circuit 102 will later be described in detail.

The integration circuits 104 to 114 integrate incoming signals under control of the timing signals $T_{G1}$ derived from the control circuit 102. The timing signal $T_{G1}$ includes an integration pulse $P_{G1\text{-}1}$ which rises at the leading edge of the position signal $T_{D1}$ and falls at the leading edge of the position signal $T_{D2}$, and an integration pulse $P_{G1\text{-}2}$ which rises at the leading edge of the position signal $T_{D4}$ and falls at the leading edge of the position signal $T_{D3}$. The integration circuits 104 to 114 perform the integrations of the reference light within the period of the pulse $P_{G1\text{-}1}$ and the integration of the object during the period of the pulse $P_{G1\text{-}2}$. In other words, the period of the pulse $P_{G1\text{-}1}$ is an integration period of the reference light and the period of the pulse $P_{G1\text{-}2}$ is an integration period of the object information.

A timing signal $T_{G2}$ as shown in FIG. 3F is applied to the integration circuits 104 to 114. The timing signal $T_{G2}$ includes a pulse $P_{G2\text{-}1}$ which rises at the leading edge of the pulse $P_{G1\text{-}1}$ and falls after a given period $P_{G1\text{-}1}+L_{G1}$ and a pulse $P_{G2\text{-}2}$ which rises at the leading edge of the pulse $P_{G1\text{-}2}$ and falls after a given period $P_{G1\text{-}2}+L_{G2}$. The pulses $P_{G2\text{-}1}$ and $P_{G2\text{-}2}$ of the timing signal $T_{G2}$ are integrated data hold signals for holding the integrated data WnR (w1R to w6R) of the reference light and the integrated data wnS (w1S to w6S) of the object information.

Within the hold period $L_G$, the integrated data w1R to w6R are applied to the multiplexer 116 where those are rearranged into a serial signal, and then is successively converted into digital signals by the converter 118, and finally are stored into the digital memory 120. More specifically, a timing signal $T_M$ having six pulses as shown in FIG. 3G is applied to the multiplexer 116 within the hold period $L_G$. In synchronism with the individual six pulses, the multiplexer 116 sequentially produces the integrated data w1R to w6R stored in the integration circuits 104 to 114 for transmission to the A/D converter 118. Applied to the converter 118 is a timing signal $T_{DA}$ having six pulses within the hold period $L_G$ as shown in FIG. 3H. The individual pulses of the timing signal $T_{DA}$ are slightly delayed in phase relative to the individual pulses of the timing signal $T_M$, respectively. In synchronism with the individual pulses of the timing signal $T_{DA}$, the A/D converter 118 sequentially effects an A-D convertion of the incoming six integrated data w1R to w6R. A timing signal $T_{BM}$ having six pulses within the hold period $L_G$ of the pulse $P_{G2\text{-}1}$ as shown in FIG. 3I is applied to the digital memory 120. The individual pulses of the timing signal $T_{BM}$ are delayed in phase relative to those of the timing signal $T_{DA}$, respectively. In synchronism with the individual pulses of the timing signal $T_{BM}$, the digital memory 120 sequentially stores the integrated data W1R to w6R A-D converted by the A/D converter 118.

The integrated data w1S to w6S also are processed within the hold time $L_G$ of the pulse $P_{G2\text{-}2}$ in the same way as that in the case of the integrated data w1R to w6R, and the processed ones are stored into the memory 120. No further explanation of them will be given.

In order to illustrate more clearly the phase relations of the individual pulses of the timing signals shown in FIGS. 3G to 3I, those pulses are exaggeratedly illustrated in comparing manner. The integrated data w1R to w6R and w1S to w6S stored in the memory 120 are loaded into the arithmetic unit 122 under control of the timing signals $T_{A1}$ and $T_{A2}$ as shown in FIGS. 3J and 3K, and then arithmetically processed therein and finally stored in the digital memory 124. In other words, the timing signals $T_{A1}$ and $T_{A2}$ as shown in FIGS. 3J and 3K are inputted to the arithmetic unit 122. The timing signal $T_{A1}$ includes six pulses occurring after the pulse $P_{G2\text{-}2}$ of the timing signal $T_{G2}$ disappears. In synchronism with the six individual pulses, the integrated data w1S to w6S are sequentially read into the arithmetic unit 122 where the operation of $Y'n=wnS\times K$ $(=w1S$ to $w6S)\times K$ is successively performed. The timing signal $T_{A2}$ includes six pulses occurring some time after the six pulses of the timing signal $T_{A1}$. In synchronism with the six pulses of the timing signal $T_{A2}$, the integrated data w1R to w6R from the memory 120 are read into the arithmetic unit 122, successively, where $Yn=Y'n/w1R$ to $w6R$ $(=(w1S$ to $w6S\times K)/w1R$ to $w6R)$ is operated. A timing signal $T_{RM}$ as shown in FIG. 3L is inputted to the memory 124. The timing signal $T_{RM}$ includes six pulses slightly delayed relative to those of the timing signal $T_{A2}$. In synchronism with the individual pulses of the timing signal $T_{RM}$, the memory 124 stores the operated data Yn (=Y1 to Y6). The operated data Y1 to Y6 stored in the memory 124 are sequentially read into the judging circuit 126 under control of a timing signal $T_{R1}$ as shown in FIG. 3M. Then, judging circuit 126 judges if the object 12 is true or false under control of the timing signal $T_{R2}$ as shown in FIG. 3N. The timing signal $T_{R1}$ includes six pulses occurring after the six pulses of the timing signal $T_{RM}$ disappear. In synchronism with the individual pulses, the operated data Y1 to Y6 are read out from the memory 124 and applied to the judging circuit 126. The timing signal $T_{R2}$ includes a single pulse occurring after the six pulses of the timing signal $T_{R1}$. In synchronism with the single pulse, the object data of the operated data Y1 to Y6 is judged by the judging circuit 126 if the operated data falls within a scope defined between the upper limit value and the lower limit value of the true object which are already stored in the judging circuit 126.

The result of the judgement is expressed in terms of logical level at the output of the judging circuit 126. When the object is true, that is to say, the object data is within the allowance of the true object, logical '1' appears at the output of the judging circuit 126. On the other hand, when it is false, logical '0' appears at the output. The judging or identifying of the object is made in the above-mentioned manner.

The identifying apparatus described referring to FIGS. 1 to 3 is free from various variations of the object detecting system such as variations of a light amount of the reference light source 46, the sensitivity of each object information detecting elements 48, 50, 52, 58, 60 and 62, and the gain of each amplifier 90 to 100, and a variation of the transportion system such as a transporting speed of the transporting belt. This will be given below.

Figure 5:
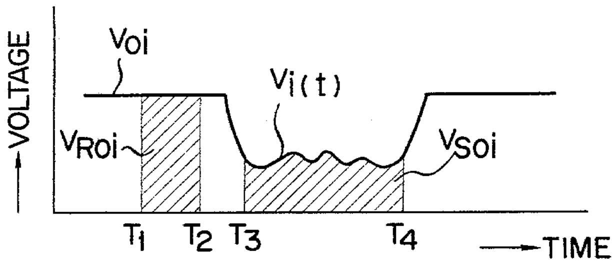
FIGS. 5 and 6 show waveforms of the output signals from an object information detecting element used in the apparatus shown in FIG. 1.

Let it be assumed that a waveform of an output signal from the amplifier 90 for amplifying the output signal from the information detecting element 48 is as shown in FIG. 5. In the figure, a flat portion denoted as $V_{oi}$ is obtained when the information detecting element 48 receives the reference light, and another decayed and wavy portion denoted as $V_{i(t)}$ is obtained when the element receives the reflecting light from the object 12. A period from time $T_1$ to $T_2$ is an integrating period of the reference signal $V_{oi}$ and a period from time $T_3$ to $T_4$ is an integrating period of the object information $V_{i(t)}$.

Figure 6:
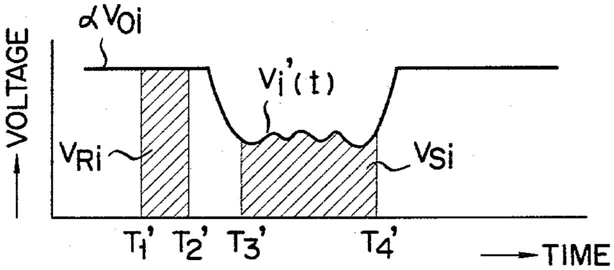

Let us assume that the waveform of the output signal from the amplifier 90 becomes the one as shown in FIG. 6 for the following reason or reasons: increase of the light amount of the reference light source, reduction of the detecting sensitivity (light sensitivity) of the object information detecting element 48, variation of the gain of the amplifier 90 (variation of the detecting system) attended with the amplitude increased by $\alpha$ times, and variation of the transport speed of the transporting belts 14, 18, . . . for the object 12 attended with the $1/\beta$ speed reduced.

In the waveform shown in FIG. 6, a flat portion denoted as $\alpha \cdot V_{oi}$ is formed whtn the object information detecting element 48 receives the reference light, and a decayed and wavy portion denoted as $V_i'(t)$ is formed when the element 48 receives the reflecting light from the object. A period from time $T_1'$ to $T_2'$ is an integrating period of the reference signal $\alpha \cdot V_{oi}$ and another period from time $T_3'$ to $T_4'$ is an integrating period of the object information $V_i'(t)$.

Assume now that the integrated data of the reference light signal of the output signal waveform shown in FIG. 5 is $V_{Roi}$, the information signal of the object 12 is $V_{Soi}$, the integrated data of the reference light of the output signal waveform shown in FIG. 6 is $V_{Ri}$ and the integrated data of the object information is $V_{Si}$. On the assumption, the integrated data $V_{Ri}$ and $V_{Si}$ are given $$V_{Ri} = \int_{T_1'}^{T_2'} V_i'(t)dt = \int_{\beta T_1}^{\beta T_2} \alpha V_o dt' = \alpha \cdot \beta \cdot V_{Roi} \tag{1}$$

$$V_{Si} = \int_{T_3'}^{T_4'} V_i'(t)dt = \int_{\beta T_3}^{\beta T_4} \alpha V_{i(t')} dt' = \alpha \cdot \beta \cdot V_{Soi} \tag{2}$$

The operation circuit 122 calculates the following expression $$Yi = V_{Si}/V_{Ri} \times K = V_{Soi}/V_{Roi} \times K \tag{3}$$

As seen from the equation (3), it has no "$\alpha$" of the variation factor in the detecting system and "$\beta$" of the variation factor in the transport system. This implies that the identifying apparatus according to the invention requires no need of a fine gain adjustment of the amplifier circuits in the detecting system, and thus is free from complicated and troublesome of the gain adjustment which is required in the conventional apparatus. Further, the apparatus is little affected by a variation of a transport speed of the belts. Therefore, the result of the judgement or identifying by the apparatus is highly accurate.

As seen from the foregoing, the sheet-like printed matter identifying apparatus according to the invention is free from identifying errors due to variation factors in the detecting system and a variation of the transport speed in the transport system, without any gain adjustment of each automatic gain control circuit.

Figure 7:
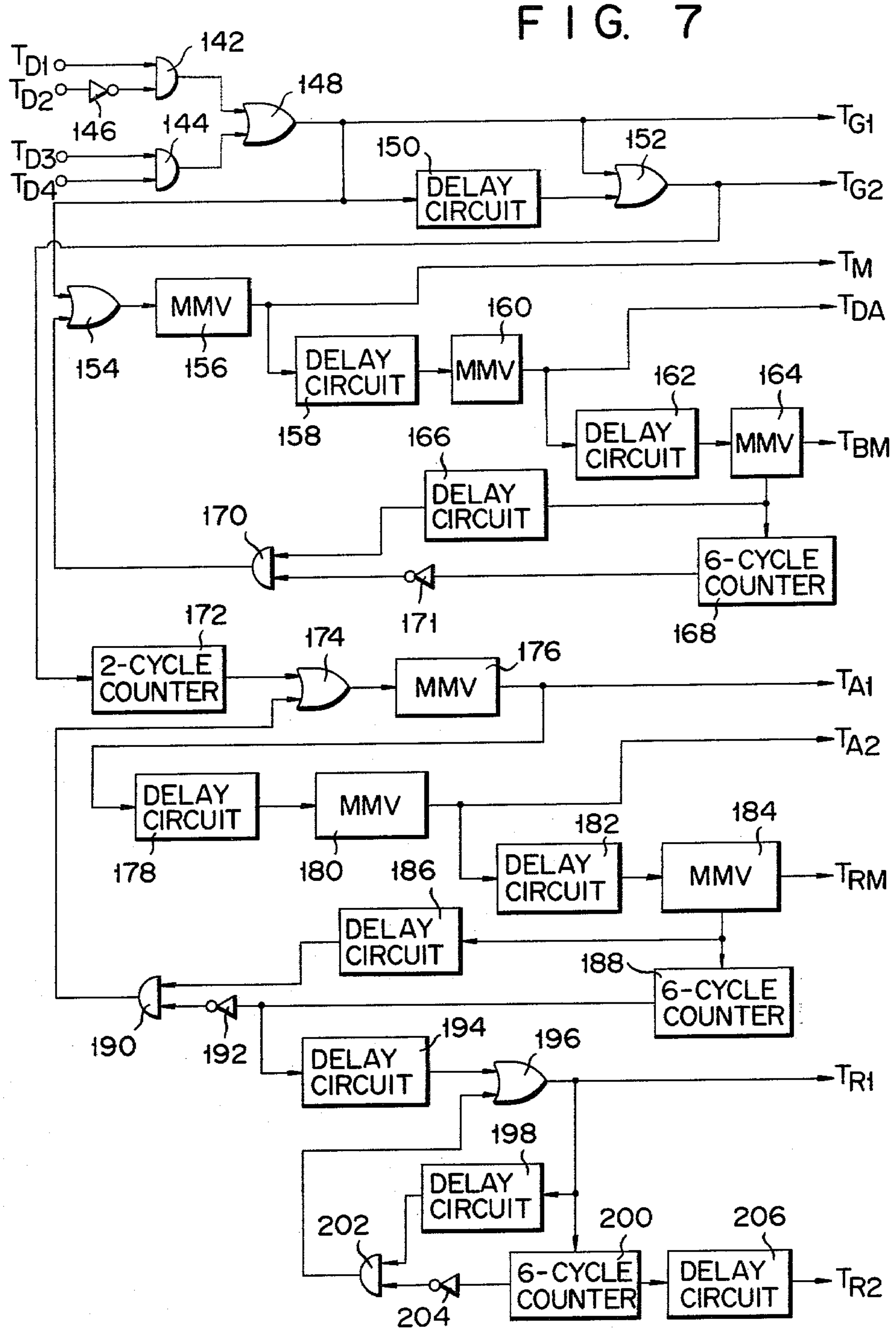
FIG. 7 shows a block diagram of the system control circuit used in the apparatus shown in FIG. 2.
Figure 8:
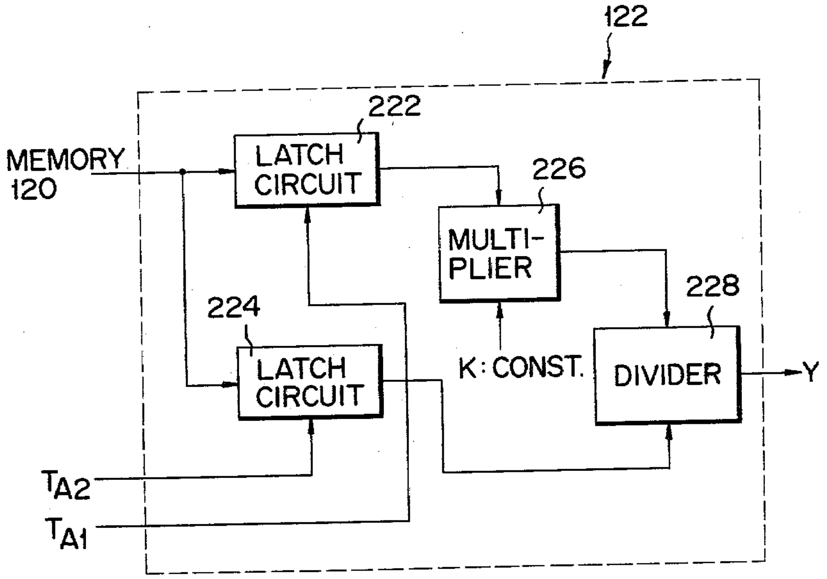
FIG. 8 shows a detail block diagram of an arithmetic unit used in the apparatus shown in FIG. 2.

The construction and the operation of the system control circuit 102 will be described with reference to FIG. 7.

In taking out timing signal $T_{G1}$ and $T_{G2}$ shown in FIGS. 3E and 3F, a position signal $T_{D1}$ is applied to one of the input terminals of an AND gate 142 and a position signal $T_{D2}$ is applied to the other input terminal of the same through an inverter 146. An OR circuit 148, which is connected at the input to the output terminals of AND gates 142 and 144, produces an output signal as the interior timing signal $I_{G1}$. The output terminal of the OR circuit 148 is connected to a delay circuit 150 for delaying an input signal by the hold time $L_G$ in the timing signal shown in FIG. 3E and to one of the input terminals of an OR circuit 152. The OR circuit 152, which is connected at the other input terminal to the delay circuit 150, receives the output signal from the delay circuit 150 and the output signal from the OR circuit 152 and produces the timing signal $T_{G2}$ as shown in FIG. 3.

In taking out the timing signal $T_M$, $T_{DA}$ and $T_{BM}$ shown in FIGS. 3G, 3H and 3I, a signal of logical '1' derived from the OR circuit 148 connecting at the output to one of the input terminals of OR circuit 154 is applied to a monostable multivibrator (MMV) 156, through the OR gate 154 of which the output is connected to the monostable multivibrator 156. Upon receipt of the logical '1', the MMV 156 produces a pulse with a given pulse width. The output pulse from the MMV 156 is taken out therefrom as the timing signal $T_M$ as shown in FIG. 3G. The output terminal of the MMV 156 is connected to a delay circuit 158 with a given delay time of which the output is connected to another MMV 160. When receiving a signal of logical '1' from the delay circuit 158, the MMV 160 produces an output with a given pulse width. The pulse from the MMV 160 is the pulse from the MMV 156 delayed by the delay time of the delay circuit 158. The output pulse from the MMV 160 is used as the timing signal $T_{DA}$ as shown in FIG. 3H. The output terminal of the MMV 160 is connected to a delay circuit 162 with a given delay time. The delay circuit 162 is connected to an MMV 164 which responds to the output signal from the delay circuit 162 to produce a pulse with a given pulse width. The output pulse from MMV 164 is delayed relative to the pulse from the MMV 160 by a delay time of the delay circuit 162. The output signal from the MMV 164 is used as the timing signal $T_{BM}$, as shown in FIG. 3I. A six-cycle counter 168 connected to the output terminal of the MMV 164 produces an output signal when it receives six output pulses from the MMV 164 which also is connected to a delay circuit 166. The output terminal of the delay circuit 166 is connected to one of the input terminals of the AND gate 170. The output terminal of the counter 168 is connected to the other input terminal of the AND gate 170 through an inverter 171. The output terminal of the AND gate 170 is connected to the input terminal of the OR gate 154. When the output from the delay circuit 166 is present and the output signal from the counter is absent, the AND gate 170 produces an output signal of logical '1'. The OR circuit 154 applies the logical '1' signal to the MMV 156. In the logic circuit from the OR circuit 154 to the AND circuit 170, when the above-mentioned operation is repeated six times, the output signal from the counter 168 becomes logical '1' and the output signal from the AND circuit 170 becomes '0', so that the MMVs 156, 160 and 164 cease their outputting of pulses. Accordingly, the MMVs 156, 160 and 164 produce the timing signals $T_M$, $T_{DA}$ and $T_{BM}$ as shown in FIGS. 3G, 3H and 3I.

The circuit construction and the operation to produce the timing signals $T_{A1}$, $T_{A2}$ and $T_{RM}$ as shown in FIGS. 3J, 3K and 3L will be described. A two-cycle counter 172 is connected to the OR circuit 152 and, when receiving two pulses from the OR circuit 152, produces an output signal. That is, it produces the output signal of logical '1' in synchronism with the second pulse $P_{G1-2}$ shown in FIG 3E. The counter 172 is connected through an OR circuit 174 to the MMV 176. The MMV 176 is connected to a delay circuit 178 which is also connected to an MMV 180. The MMV 180 is connected to a delay circuit 182 connected to an MMV 184. The MMV 184 is connected to a delay circuit 178 further connecting to an MMV 180. The MMV 180 is connected to a delay circuit 182 also connecting to an MMV 184. The MMV 184 is connected to a delay circuit 186 and to a six-cycle counter 188 which produces an output signal when receiving six pulses. The delay circuit 186 is connected to one of the input terminals of an AND gate 190. The counter 188 is connected to the other input terminal of the AND gate 190 through an inverter 192. The output terminal of the AND gate 190 is connected to an OR gate 174. The operation of the logic arrangement from the OR gate 174 to the AND circuit 190 is substantially the same as that of the logic arrangement from the OR circuit 154 to the AND gate 170 referred to relating to the timing signals $T_M$, $T_{DA}$ and $T_{BM}$ shown in FIGS. 3G, 3H and 3I. Therefore, the description thereof will be omitted, except that the timing signals $T_{A1}$, $T_{A2}$ and $T_{RM}$ as shown in FIGS. 3J, 3K and 3L are produced from the MMVs 176, 180 and 184 as those $T_{M1}$, $T_{DA}$ and $T_{BM}$ are taken out from the MMVs 156, 160 and 164.

The construction and the operation for producing the timing signals $T_{RM}$, $T_{R1}$ and $T_{R2}$ as shown in FIGS. 3L, 3H and 3N will be described. A six-cycle counter 188 is connected to a delay circuit 194 which is connected through an OR circuit 196 to a delay circuit 198 and to a six-cycle counter 200. The delay circuit 194 delays by a given time delay the output signal from the six-cycle counter 188. The output signal is taken out through an OR circuit 196 as the signal $T_{R1}$ and is applied to a delay circuit 198 and a six-cycle counter 200. The delay circuit 198 is connected to one of the input terminals of an AND circuit 202 of which the other input terminal is connected through an inverter 204 to the output terminal of a counter 200. The output terminal of an AND circuit 202 is connected to an OR circuit 196. The AND circuit 202 permits the output pulse from the delay circuit 198 to pass to the OR circuit 196 until the six-cycle counter 200 counts six pulses. Therefore, the output signal from the OR circuit 196 includes six successive pulses as shown in FIG. 3M. The output terminal of the counter 200 is connected to the delay circuit 206 which delays the output pulse from the counter 200 by a given time. The output signal from the delay circuit 206 is taken out as the timing signal $T_{R2}$ as shown in FIG. 3N.

The circuit arrangement and operation of the arithmetic circuit 122 will be described. The arithmetic circuit 122 is comprised of first and second latch circuits 222 connecting to a memory 120, a multiplier circuit 226 connecting to the first latch circuit 222, and a division circuit 228 connecting to the second latch circuit 224 and the multiplier circuit 226. The latch circuit 222 holds the object information integrated data w1S to w6S and applies those data to the multiplier under control of the timing signal $T_{A1}$. That is, it successively applies those data to the multiplier in synchronism with the respective pulses of the timing signal $T_{A1}$. In the multiplier circuit, w1S to w6S×K (K is constant) is performed. The latch circuit 224 holds the integrated data w1R to w6R of the reference light and applies those integrated data to the multiplier 228 under control of the timing signal $T_{A2}$. That is, those data are successively are applied to the multiplier in synchronism with the output pulse of the timing signal $T_{A2}$. In the multiplier, the integrated signal (w1S to w6S)×K also is received and a division (w1S to w6S/w1R to w6R)×K is performed.

Figure 9:
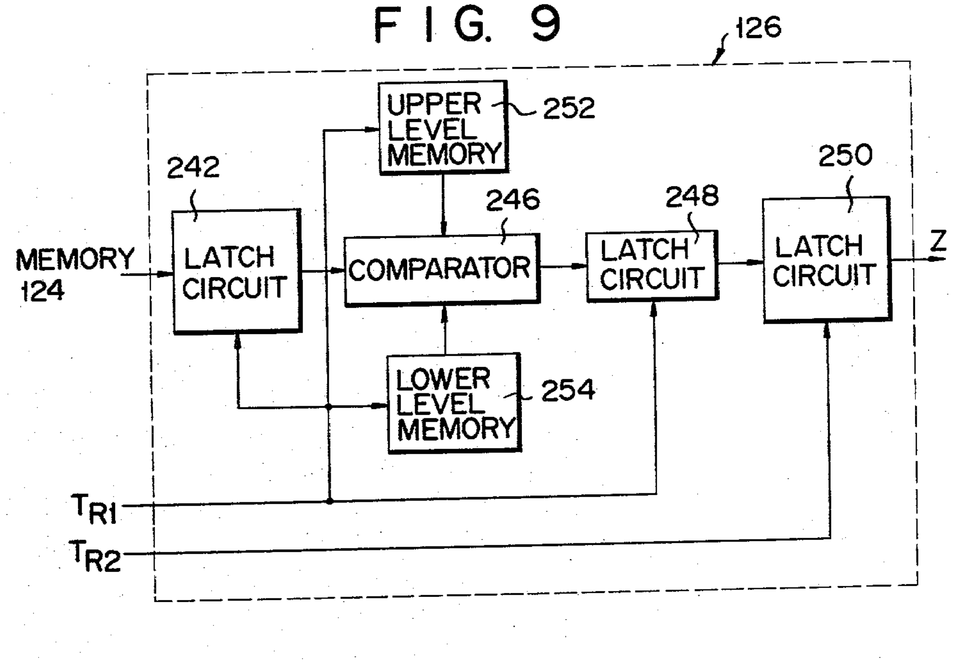
FIG. 9 shows a detail block diagram of a judging circuit shown in FIG. 2.

The construction and the operation of the judging circuit 126 will be described with reference to FIG. 9. The judging circuit 126 is comprised of a latch circuit 242 connected to the digital memory 124, a comparator 246 connected to the latch circuit 242, a latch circuit 248 connected to the comparator 246, a latch circuit 250 connected to the latch circuit 248, an upper level memory 252 connected to the comparator 246 and storing the upper limit level of the true data, and a lower level memory 254 for storing the lower level of the true data. The latch circuit 242 holds the operation data Yn (Y1 to Y6) from the memory 124 and sequentially supplies the operated data Y1 to Y6 under control of the timing signal $T_{R1}$, that is, in synchronism with the respective pulses of the timing signal $T_{R1}$. The timing signal $T_{R1}$ is also applied to upper and lower level memories 252 and 254 and permits the upper and lower level data of the true object data to enter the corresponding memories in synchronism with the inputting of the operated data Y1 to Y6 to a comparator 246. The comparator 246 checks whether each of the operated data Y1 to Y6 falls within a scope defined by the upper and lower level data or not. When it within the scope, the comparator 246 produces an output signal of logical '1', while, when it is outside the scope, the comparator produces a logical '0' signal. The checked data of the operated data Y1 to Y6 are successively latched by a latch circuit 248 under control of the timing signal $T_{R1}$. The latch circuit 248 has six input terminals, for example, and produces a logical '1' signal when the output signals representing the result of the comparison from the comparator 246 are all logical '1'. The output signal from the latch circuit 248 is inputted to the latch circuit where the signal from the latch circuit 250 is judged as to whether the object 12 is true or not under control of the timing signal $T_{R2}$. The latch circuit 250 is comprised of a flip-flop circuit. When the signal from the latch circuit 248 is logical '1', the logical state of the latch circuit 250 is inverted, so that the logical level of the output signal from the latch circuit 250 is inverted. The reversal of the logical state of the latch circuit indicates that the object is true.

In the above-mentioned embodiment, the digital memory 120, the arithmetic unit 122, the digital memory 124 are constructed by separate logic circuits. Those circuits, however, may be replaced by a microprocessor with a memory function and an arithmetic operation function. Of those opto-electric converting elements 36, 40, 54 and 56, the element 40 may be omitted. In this case, the pulse $P_{G1\text{-}1}$ of the timing signal $T_{G1}$ shown in FIG. 3E falls at the leading edge of the pulse of the signal $T_{D3}$. A plurality of the object information detecting areas may be used and, in this case, the number of the object information detecting elements and the position detecting elements must be increased correspondingly. Further, either of two groups of the information detecting elements for the transmitted light and the reflected light may be omitted. The embodiment, which operates with the positive logic, may be modified to operate with the negative logic.

What we claim is:

1. An apparatus for identifying whether a sheet-like object is true or false, comprising:

means for detecting a plurality of positions of a moving sheet-like object to produce a plurality of position signals;

timing signal generating means for producing timing signals on the basis of the position signals;

a light source for irradiating an information detecting area lying on said object moving path to detect the information of the sheet-like object;

opto-electric converting means which produces first electric data with an amplitude corresponding to an intensity of at least one of light transmitted through the object and light reflected from the object when the object is present in the information detecting area and second electric data with an amplitude corresponding to an intensity of light omitted from the light source when the object is absent in the information detecting area;

integrating means for integrating said first electric data in terms of light detected during a reference period when the object is absent in the detecting area and said second electric data in terms of light detected during a detecting period when the object is present in the detecting area, said reference period and said detecting period being defined by the timing signals from the timing signal generating means;

memory means for storing first integrated data obtained by integrating said first electric data by said integrating means during said reference period and second integrated data obtained by integrating said second electric data by said integrating means during said detection period;

operation means for obtaining data which is a ratio between said first intergrated data and said second integrated data; and judging means which compares said obtained data derived from the operation means with data representing a true object previously stored to judge whether the object is true or false.

2. An identifying apparatus according to claim 1, wherein said position detecting means includes first to fourth detecting elements arranged successively in a direction in which said sheet-like object is moved, said first and second detecting elements being disposed on one side of the information detecting area while said third and fourth detecting elements are disposed at the leading portion and the trailing portion of the information detecting area in the direction in which said sheet-like object is moved; said reference period being a period between the time at which said first detecting element detects the sheet-like object and the time at which said second detection element detects the same; and said detection period being a period between the time at which said fourth detecting element detects the sheet-like object and the time at which said third detecting element detects the end portion of said sheet-like object.

3. An identifying apparatus according to claim 1, wherein said position detecting means includes first to third detecting elements arranged successively in a direction in which the sheet-like object is moved, said first detecting element being disposed on one side of the information detecting area while said second and third detecting elements being disposed at the leading portion and the trailing portion of the information detecting area in the direction in which the sheet-like object is moved; said reference period being a period between the time at which said first detecting element detects said sheet-like object and the time at which said second detecting element detects the same; and said detection period being a period between the time at which said third detecting element detects the sheet-like object and the time at which said second detecting element detects the end portion of the sheet-like object.

4. An apparatus for identifying whether a sheet-like object is true or false, comprising:

means for detecting a plurality of positions of a moving sheet-like object to produce a plurality of position signals;

timing signal generating means for generating timing signals on the basis of the position signals;

a light source for irradiating an information detecting area lying on the moving path of said object to detect the information on said sheet-like object;

a plurality of opto-electric converting means which each produces first electric data with an amplitude corresponding to an intensity of at least one of light transmitted through the object and light reflected from the object when the object is present in the information detecting area and second electric data with an amplitude corresponding to an intensity of emitted from said light source when the object is not in the information detecting area;

a plurality of integrating means which are connected to said opto-electric converting means, each of said integrating means integrating said first electric data in terms of light detected during a reference period when the object is absent in the detecting area and said second electric data in terms of light detected during a detection period when said object is present in the detection area, said reference period and detection period being defined by the timing signals from the timing signal generating means;

a multiplexer connected to the integrating means for sequentially producing first integrated data and second integrated data in a given order, said first integrated data being obtained by integrating said first electric data by said integrating means during said reference period and said second integrated data obtained by integrating said second electric data by said integrating means during said detection period;

an analog to digital converter for converting said first and second integrated data from the multiplexer into first and second digital data, respectively;

a first memory for storing said first and second digital data from said analog to digital converter;

arithmetic means for calculating data which is a ratio between said first digital data and said second digital data;

a second memory for storing said calculated data from said arithmetic means; and judging means which compares said calculated data stored in the second memory with the true data of a true object previously stored to judge if said object is true or not.

* * * * *

UNITED STATES PATENT AND TRADEMARK OFFICE

CERTIFICATE OF CORRECTION

PATENT NO. : 4,319,137

DATED : Mar. 9, 1982

INVENTOR(S) : Yasushi Nakamura, et. al.

It is certified that error appears in the above—identified patent and that said Letters Patent is hereby corrected as shown below:

On the cover sheet, delete Item [30] Foreign Priority Data.

Signed and Sealed this

*Fifteenth* Day of *June 1982*

[SEAL]

*Attest:*

GERALD J. MOSSINGHOFF

*Attesting Officer* *Commissioner of Patents and Trademarks*